United States Patent
Stark et al.

(10) Patent No.: US 11,966,005 B2
(45) Date of Patent: Apr. 23, 2024

(54) SYSTEM AND METHOD FOR ARRAYED TELEMETRY USING SINGLE-PHOTON DETECTORS

(71) Applicant: Halliburton Energy Services, Inc., Houston, TX (US)

(72) Inventors: Daniel J. Stark, Houston, TX (US); John L. Maida, Jr., Houston, TX (US); Li Gao, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 934 days.

(21) Appl. No.: 16/761,658

(22) PCT Filed: Dec. 21, 2017

(86) PCT No.: PCT/US2017/067971
§ 371 (c)(1),
(2) Date: May 5, 2020

(87) PCT Pub. No.: WO2023/075739
PCT Pub. Date: May 4, 2023

(65) Prior Publication Data
US 2023/0273337 A1    Aug. 31, 2023

(51) Int. Cl.
*G01V 8/16*       (2006.01)
*E21B 47/002*  (2012.01)
*E21B 47/13*    (2012.01)

(52) U.S. Cl.
CPC .............. *G01V 8/16* (2013.01); *E21B 47/002* (2020.05); *E21B 47/13* (2020.05)

(58) Field of Classification Search
CPC .......... G01V 8/16; E21B 47/13; E21B 47/002
See application file for complete search history.

(56) References Cited

U.S. PATENT DOCUMENTS

| | | | | |
|---|---|---|---|---|
| 5,768,002 A | * | 6/1998 | Puzey | G02F 1/0147 359/321 |
| 5,966,224 A | | 10/1999 | Hughes | |
| 6,812,464 B1 | * | 11/2004 | Sobolewski | H01L 31/101 250/336.2 |

(Continued)

FOREIGN PATENT DOCUMENTS

| | | |
|---|---|---|
| JP | 2014049714 A | 3/2014 |
| WO | 2013106102 A1 | 7/2013 |
| WO | WO2017082889 A1 | 5/2017 |

OTHER PUBLICATIONS

Marsili et al, Detecting single infrared photons with 93% system efficiency, Nat. Photonics, Feb. 2013, 210-214, vol. 7, No. 3.

(Continued)

*Primary Examiner* — Hugh Maupin
(74) *Attorney, Agent, or Firm* — K&L Gates LLP

(57) ABSTRACT

A telemetry system is disclosed for use in a wellbore extending from the surface. The telemetry system includes fiber optic cable locatable in the wellbore, the fiber optic cable including at least one optical fiber. The telemetry system also includes a telemetry device operable to transmit an optical telemetry signal over the fiber optic cable. An optical detector operably connected to the optical fiber and includes a single-photon detector operable to receive the optical telemetry signal transmitted over the optical fiber.

20 Claims, 11 Drawing Sheets

(56) References Cited

U.S. PATENT DOCUMENTS

| | | | |
|---|---|---|---|
| 7,049,593 B2 | 5/2006 | Sobolewski et al. | |
| 7,515,774 B2 | 4/2009 | Vannuffelen et al. | |
| 7,844,188 B2 | 11/2010 | Takemoto | |
| 8,164,476 B2 | 4/2012 | Hache | |
| 9,787,624 B2 | 10/2017 | Gunnewiek | |
| 2006/0133711 A1 | 6/2006 | Vannuffelen et al. | |
| 2011/0163891 A1* | 7/2011 | Wilson | H04B 10/25891 398/141 |
| 2012/0068086 A1* | 3/2012 | DeWitt | E21B 37/00 250/492.1 |
| 2012/0077680 A1* | 3/2012 | Berggren | G01J 1/42 427/63 |
| 2013/0172195 A1* | 7/2013 | Bellei | G01J 5/0806 250/353 |
| 2014/0285875 A1* | 9/2014 | Jaaskelainen | G01V 8/16 359/341.1 |
| 2014/0299751 A1 | 10/2014 | Tang et al. | |
| 2014/0353476 A1* | 12/2014 | Bachar | H10N 60/85 250/227.24 |
| 2015/0070185 A1 | 3/2015 | Schulz | |
| 2015/0362688 A1* | 12/2015 | Pernice | B82Y 20/00 438/69 |
| 2017/0009571 A1 | 1/2017 | Bhongale et al. | |
| 2017/0186933 A1* | 6/2017 | Sunter | H01L 31/107 |
| 2018/0073356 A1* | 3/2018 | Hassig Fonseca | E21B 47/135 |
| 2018/0308086 A1 | 10/2018 | Shan | |
| 2019/0051699 A1* | 2/2019 | Harrabi | H10N 60/84 |

OTHER PUBLICATIONS

Verma et al, A four-pixel single-photon pulse-position array fabricated from WSi superconducting nanowire single-photon detectors, Appl. Phys. Lett, 2014, 5, vol. 104, 051115, Appl. Phys. Lett.

Li, Y., Abdallah, M. M., Qaraqe, K. A., Uysal, M., & Haas, H. (2014). Single Photon Avalanche Diode (SPAD) VLC System and Application. In Proc. of 2014 IEEE Global Communications Conference (GLOBECOM).

International Search Report and Written Opinion dated Jun. 19, 2023 for corresponding PCT Patent Application No. PCT/US2017/067971 filed on Dec. 21, 2017.

* cited by examiner

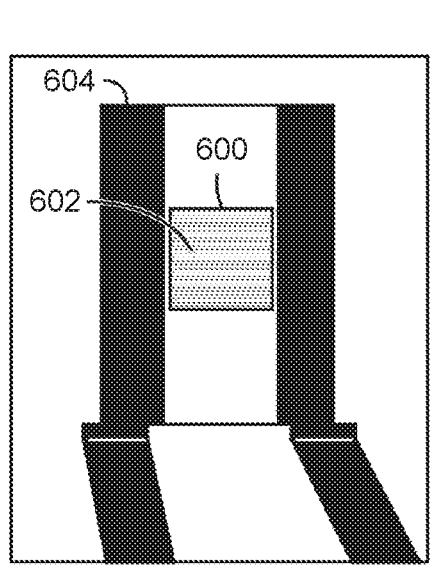
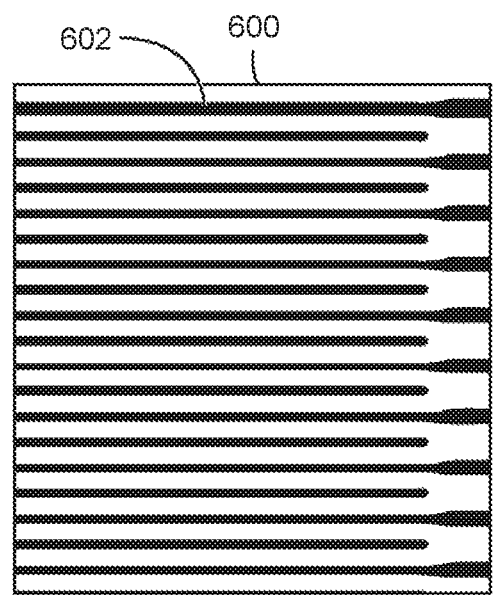
FIG. 6A                FIG. 6B
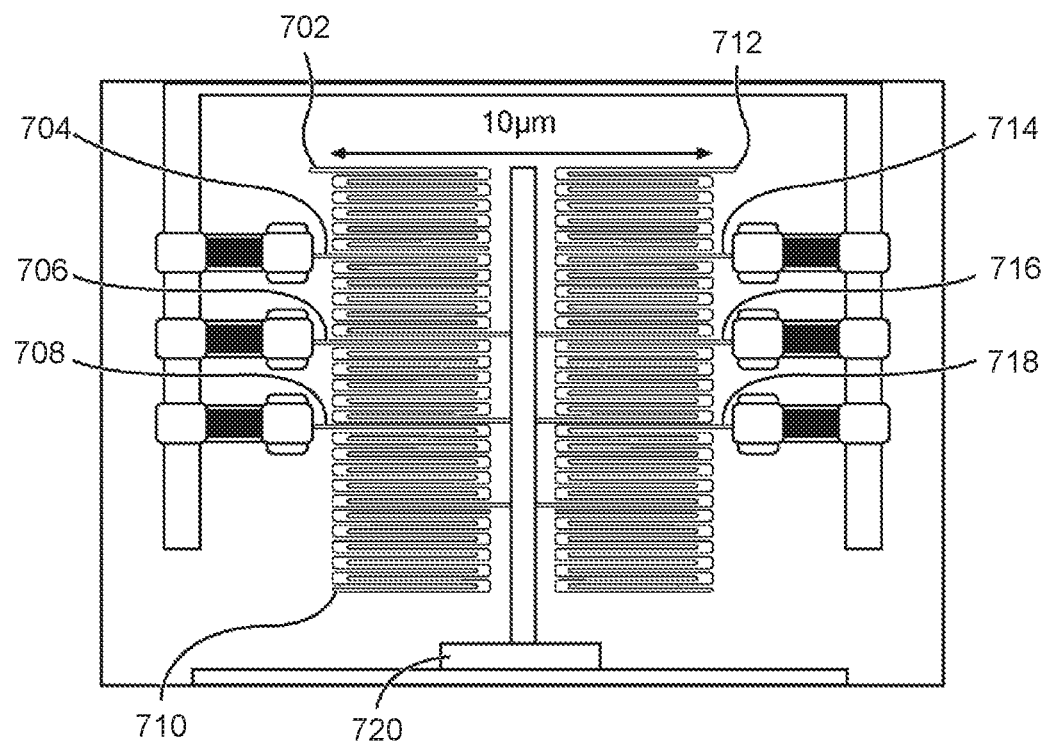
FIG. 7

SYSTEM AND METHOD FOR ARRAYED TELEMETRY USING SINGLE-PHOTON DETECTORS

BACKGROUND

Petroleum drilling and production operations demand a great quantity of information relating to parameters and conditions downhole. Such information typically includes characteristics of the earth formations traversed by the wellbore, along with data relating to the size and configuration of the borehole itself.

The collection of information relating to conditions downhole, referred to as "logging," can be performed by several methods and may involve sending information from downhole to the surface using a number of telemetry systems. Of these, optical fiber telemetry is used to transmit data via a modulated optical signal. Optical telemetry for downhole deployments, whether it is for wireline and perforating applications, production applications, or drilling applications, is limited in data rate, deployment depth, and reliability due to optical signal attenuation encountered along the fiber. Signal attenuation can occur due to hydrogen darkening, fiber strain, bends, scattering, or signal loss resulting from optical connectors or splices in the fiber.

BRIEF DESCRIPTION OF THE DRAWINGS

Embodiments of the disclosure are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIG. 6A depicts a schematic view of an example superconducting nanowire single-photon detector (SNSPD), according to one or more embodiments;

FIG. 6B depicts an enlarged schematic view of the SNSPD in FIG. 6A;

FIG. 7 depicts a schematic view of an example SNSPD having multiple superconducting nanowire structures, according to one or more embodiments;

DETAILED DESCRIPTION

Figure 1:
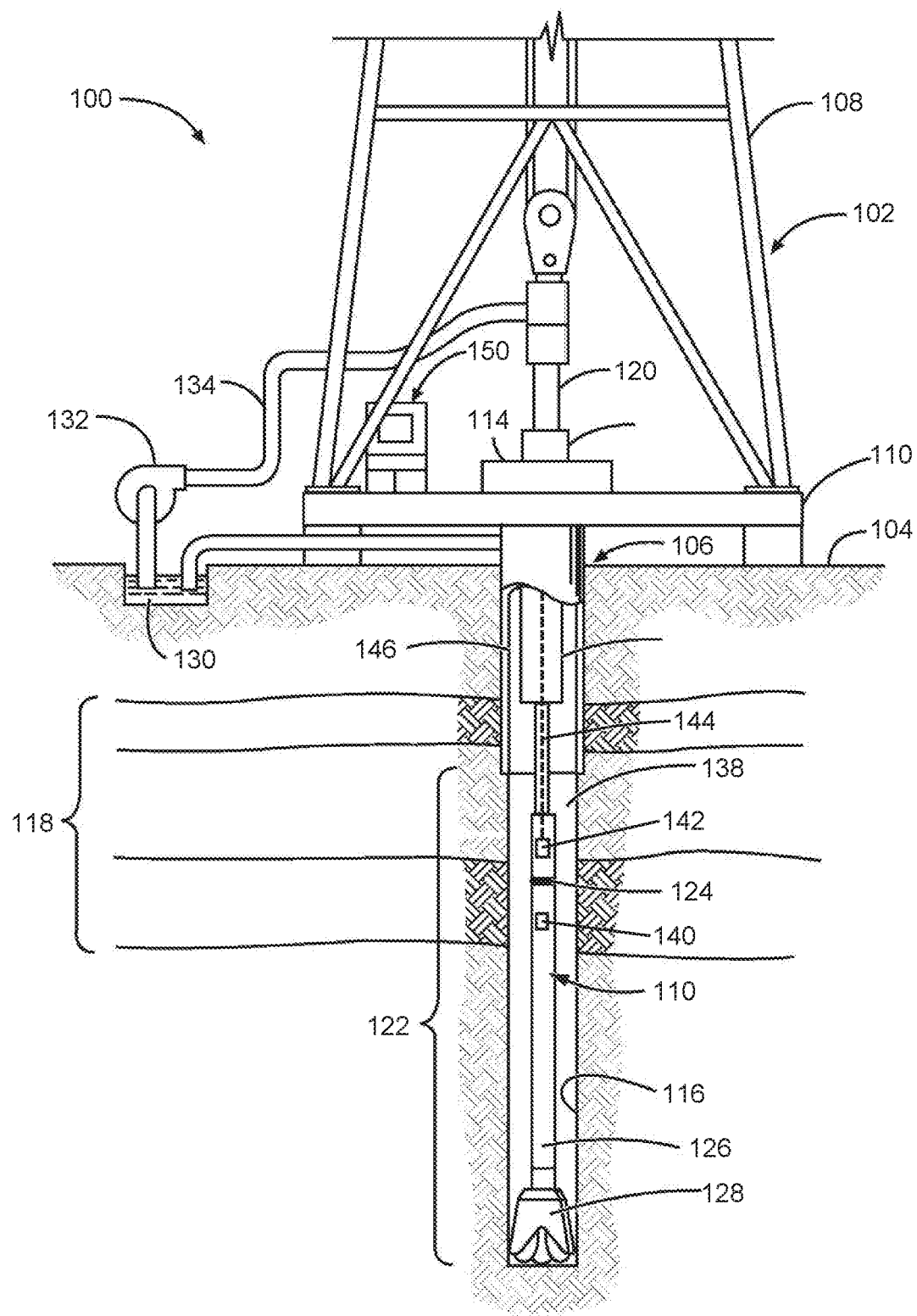
FIG. 1 depicts an elevation view of an example drilling application employing the optical telemetry system, according to one or more embodiments.

FIG. 1 shows an elevation view of a well system 100 employing a fiber optic telemetry system using a fiber optic cable in a drilling application, in accordance with one or more embodiments. The fiber optic cable includes at least one optical fiber where optical signals may be transmitted unidirectionally or bidirectionally between a device in a wellbore and control equipment at the surface. The fiber optic cable may include a housing, jacket, conduit, cladding, or sheath with at least one optical fiber therein. Information transmitted along the fiber optic cable may be any information relating to the wellbore, including but not limited to pressure, temperature, distributed temperature, pH, amount of precipitate, fluid temperature, depth, chemical luminescence, gamma-ray, resistivity, salinity, fluid flow, fluid compressibility, viscosity, compression, stress, strain, location, state, orientation, or combinations thereof. Additional examples of information transmittable along the optical fiber or fiber optic cable are discussed below. To utilize a fiber optic cable in a drilling application, portions of the fiber optic cable may be coupled together using fiber optic connectors as further described herein with respect to FIG. 4. The cumulative effect of using hundreds of connectors or splices at drill pipe joints produces optical communication losses. For instance, optical losses can be in excess of 100 dB for drill strings of 10,000 feet (3,048 meters). Single-photon detectors (SPD), however, can detect optical signals of −130 dBm to −160 dBm. As further described herein, an optical detector (not shown) employing one or more SPDs can be used to detect optical telemetry signals in various well systems that exhibit optical power losses in excess of 100 dB.

As shown in FIG. 1, the well system 100 includes a drilling rig 102 located at the surface 104 of a well 106. The drilling rig 102 includes a tower or derrick 108 which provides support for a drill string 110 and is supported by a derrick floor 112. The derrick floor 112 also supports a rotary table 114 that is driven at a desired rotational speed, for example, via a chain drive system through operation of a prime mover (not shown). The rotary table 114, in turn, provides the necessary rotational force to a drill string 110. The drill string 110 extends downwardly from the rotary table 114 into a wellbore 116 which penetrates subterranean earth formations 118. The wellbore 116 may travel along a deviated multi-dimensional path or "trajectory."

The drill string 110 can include a Kelly 120 and a bottom hole assembly 122, perhaps located at the lower portion of the drill string 110. The bottom hole assembly 122 can include drill collars 124, a downhole tool 126, and a drill bit 128. The drill bit 126 can operate to create the borehole 112 by penetrating the surface 104 and the subsurface formations 118.

During drilling operations, a drilling fluid is pumped from a pit 130 at the surface by a mud pump 132 through the line 134, into the drill string 110 and to the drill bit 128. After flowing out through the face of the drill bit 128, the drilling fluid rises back to the surface through the annular area 138 between the drill string 110 and the wellbore 116. At the surface the drilling fluid is collected and returned to the pit 130 for filtering. The drilling fluid is used to lubricate and cool the drill bit 128 and to remove cuttings from the wellbore 116.

The downhole tool 126 can comprise any of a number of different types of sensors 140. The sensors 140 of the downhole tool 126 may include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The downhole tool 126 may also include additional/alternative sensing devices for measuring shock, vibration, torque, telemetry, etc. The above-noted devices may transmit data to a downhole telemetry device 142, which in turn transmits the data uphole to a surface controller 150.

The telemetry device 142 may use an optical communication technique to communicate data from the downhole sensors during drilling operations. Other methods of telemetry which may be used without departing from the intended scope of this disclosure include mud pulse telemetry, electromagnetic telemetry, acoustic telemetry, and wired drill pipe telemetry, among others.

Figure 3:
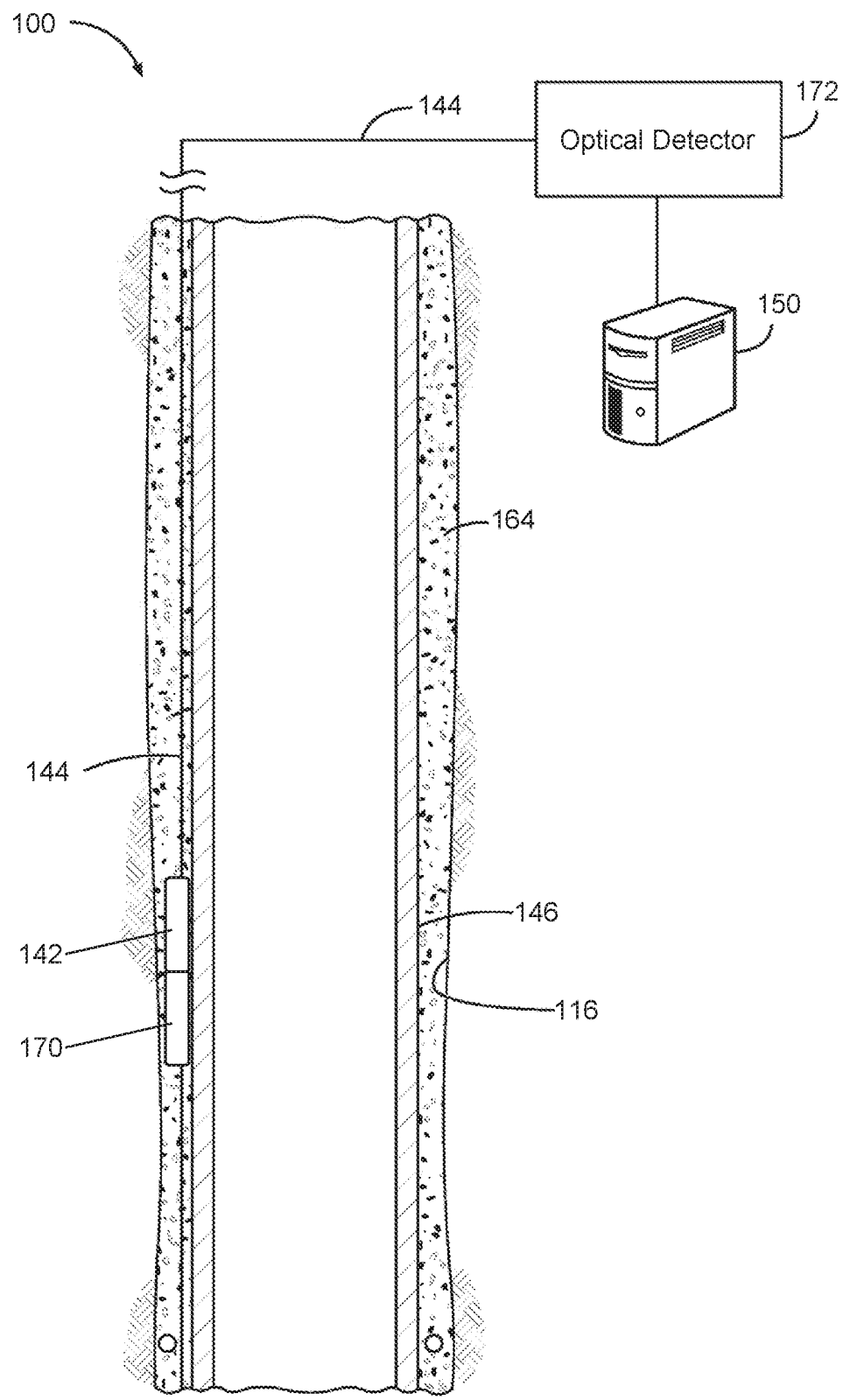
FIG. 3 depicts an elevation view of an example production well employing an optical telemetry system, according to one or more embodiments.

A fiber optic cable 144, including at least one optical fiber, is deployed in the wellbore to provide an optical communication path for the telemetry device 142 as further described herein with respect to FIGS. 4-12C. The fiber optic cable 144 is spliced, rerouted, coupled, guided, or otherwise modified to maintain connections at each drill pipe joint (not shown) along the drill string 108. In some embodiments, a fiber optic connector can be provided at each drill pipe joint along the drill string 110. In some embodiments, the fiber optic cable 144 can be placed inside a steel casing 146, outside the casing 146 (as shown in FIG. 3 and further described below), inside or outside of a production tube, inside or outside of coiled tubing, on a wireline cable, or in any other placement, configuration, or combination thereof. The telemetry device 142 can also be placed in a repeater configuration or in an amplifier configuration to improve signal strength at the surface. The fiber optic cable 144 can also be deployed continuously through a drill string using a dart, a torpedo, a reel, a feedthrough, or some other deployment device.

At the surface, the fiber optic cable 144 is coupled to a fiber optic rotary joint (not shown) which passes the optical signal to an optical detector (not shown) located on the rig floor. The optical detector receives the optical signals transmitted from the downhole tools using the fiber optic cable 144. The optical detector is used to detect low power optical signals which may occur as a result of using the optical connectors along the drill string 108. The optical detector includes a single-photon detector (SPD) to improve the sensitivity to low power optical signals, as further described herein with respect to FIGS. 5-10.

The surface controller 150 receives signals from surface and downhole sensors and devices via the surface transceiver. The surface controller 150 may present to an operator desired drilling parameters and other information via one or more output devices (not shown), such as a display, a computer monitor, speakers, lights, etc., which may be used by the operator to control the drilling operations. The surface controller 150 also includes a processor and memory (not shown), which are operable to process the received signals according to programmed instructions. The surface controller 150 may process data according to programmed instructions, such as data models, and respond to user commands entered through a suitable input device (not shown) in the nature of a keyboard, touchscreen, microphone, mouse, joystick, image sensor, or other user input devices.

Figure 2:
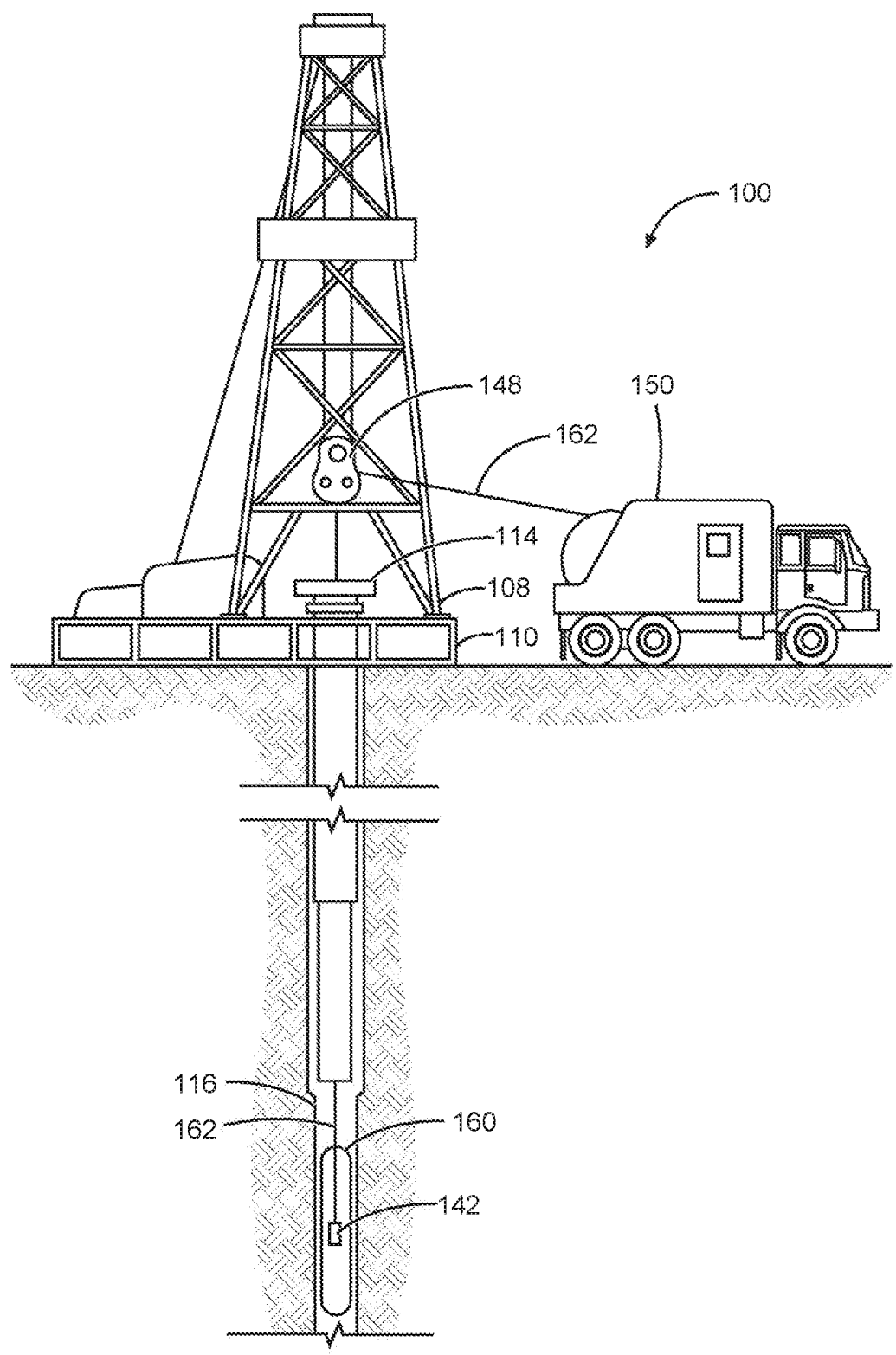
FIG. 2 depicts an elevation view of an example wireline system employing an optical telemetry system, according to one or more embodiments.

In addition to drilling applications, example embodiments can also be implemented in wireline logging applications. FIG. 2 shows an elevation view of the well system 100 employing a wireline logging tool 160, in accordance with one or more embodiments. The well system 100 includes a wireline logging tool 160 used as part of a wireline logging operation. In this case, the derrick 108 supports a hoist 148 that lowers and raises the wireline logging tool 160 in the wellbore 116.

The wireline logging tool 160 may be any suitable logging tool, such as a probe or sonde, for gathering data and is lowered by wireline or logging cable 162 into the wellbore 116. The wireline logging tool 160 is lowered to the bottom of the region of interest and subsequently pulled upward, gathering measurement data as it moves.

The wireline logging tool 160 is suspended in the wellbore by a wireline cable 162 that connects the tool 160 to the surface controller 150. This wireline cable 162 can include (or perform functionalities of) a fiber optic cable (not shown) in communication with an optical detector (as show and discussed in FIGS. 5-10). The tool 160 can be deployed in the wellbore 116 on coiled tubing, jointed drill pipe, hard wired drill pipe, or any other suitable deployment technique.

During the upward trip at a series of depths, downhole sensors (not shown) included in the wireline logging tool 160 can be used to perform measurements on the subsurface geological formations adjacent the wellbore 116 (and the wireline logging tool 160). The wireline logging tool 160 can include or otherwise be utilized in conjunction with any number of measurement tools such as resistivity tools, seismic tools, acoustic tools, temperature sensors, porosity sensors and others. The wireline logging tool 160 is also equipped with a telemetry device 142 to communicate with the surface controller 150 for storage, processing, and analysis, via the wireline cable 162. The telemetry device 142 can take any desired form, and different transmission media and methods can be used. The surface controller 150 includes electronic equipment for various types of signal processing, which can be implemented by any one or more of the components of an optical telemetry system as further described herein with respect to FIG. 5.

In addition to the applications previously discussed, example embodiments can also be implemented in a production application. FIG. 3 is an elevation view of the well system 100 employing a permanent monitoring system during oil and gas production. In the system 100, cement 164 fills an annulus formed radially between the casing 146 and the wellbore 116. The system 100 further includes an optical detector 180 and the surface controller 150. The functionality of the optical detector 180 is further described with respect to FIGS. 5-10.

Conditions of the cement, or other downhole conditions of the well or formation, can be monitored using one or more downhole sensors 170 disposed in the well. The sensors 170 are operative to sense various parameters in the well, for example pressure, temperature, as well as take seismic measurements of the cement 164 and surrounding formation. The downhole sensors 170 transmit the measurements to the telemetry device 142, which communicates the measurement data with the surface controller 150 via the fiber optic cable 144. As depicted in FIG. 3, the fiber optic cable 144 is positioned in the annulus between the casing 146 and the wellbore 116, but in other examples the fiber optic cable 144 and sensors 170 may be positioned inside the casing, or adjacent the wellbore 116. The fiber optic cable 144 can be strapped, clamped, or otherwise secured to an exterior of the casing 146.

As used herein, the term "cement" is used to indicate a hardenable material which is used to seal off an annular space in a well. Cement is not necessarily cementitious, and other types of materials (e.g., polymers, such as epoxies, etc.) can be used in place of, or in addition to, a Portland type of cement. Cement can harden by hydrating, by passage of time, by application of heat, by cross linking, and/or by any other technique.

As used herein, the term "casing" is used to indicate a generally tubular string that forms a protective wellbore lining. Casing may include any of the types of materials know to those skilled in the art as casing, liner or tubing. Casing may be segmented or continuous, and may be supplied ready for installation, or may be formed in situ.

Figure 4:
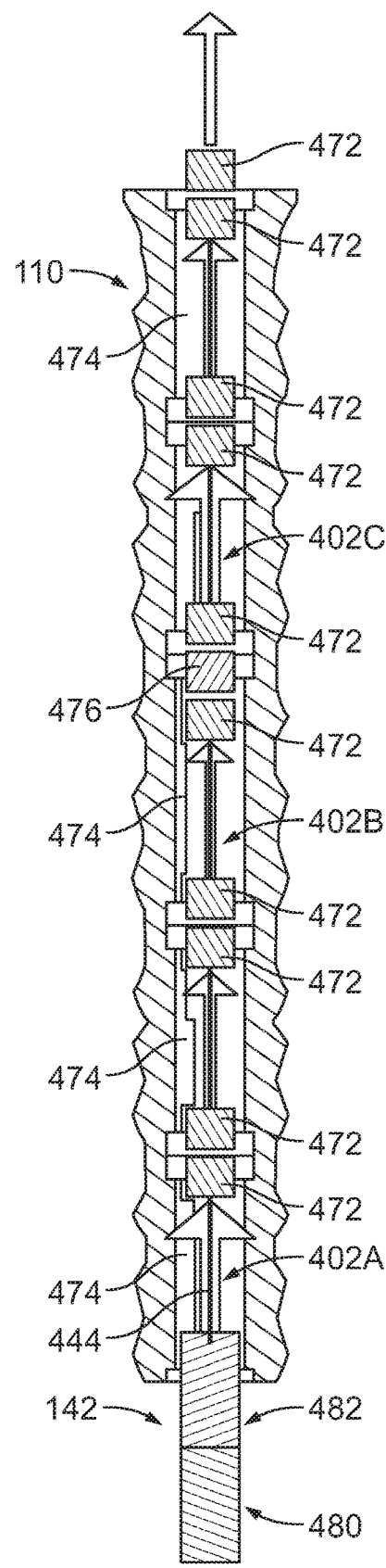
FIG. 4 depicts a diagram view of an example placement of optical devices employed to couple portions of a fiber optic cable together, according to one or more embodiments.

As previously mentioned, the fiber optic cable may be spliced, rerouted, coupled, guided, or otherwise modified to maintain connections within the wellbore. FIG. 4 shows a diagram view of the placement of optical devices 472 employed to couple portions of the fiber optic cable (not shown) together along the drill string 110. As shown, the drill string 110 is a jointed pipe formed of drill pipe 474 coupled together. The optical devices 472 may be positioned along the drill string at the connection points of the drill string 110. The optical devices 472 may include fiber optic couplers or the like.

The telemetry device 142, which includes a light source 480 and an optical modulator 482, emits an optical signal 402A into the fiber optic cable 444. As the optical signal encounters the optical devices 472, the signal strength of the optical signal 402B attenuates. This attenuation is depicted by the narrower width of the optical signal 402B compared to the optical signal 402A.

In the case of long drill strings (in excess of 10,000 ft or 3,048 meters) where the optical losses may be larger than 170 dB, for robust communication, it may be necessary to boost the optical signal sufficiently such that it reaches the surface. As shown in FIG. 4, amplifiers 476, such as semiconductor optical amplifiers or doped fiber amplifiers, take a signal before the optical signal is completely diminished and increases the signal's power levels, typically 20 dB to 30 dB, at the cost of requiring external power and some increased noise levels. To mitigate the attenuation, the optical amplifier 476 may be coupled to the optical fiber to amplify the optical signal as depicted by the optical signal 402C. The amplifier 476 may serve as an optical repeater and strengthen the optical signal transmitted along the optical fiber, which in turns provides an increased telemetry range for optical telemetry system.

Figure 5:
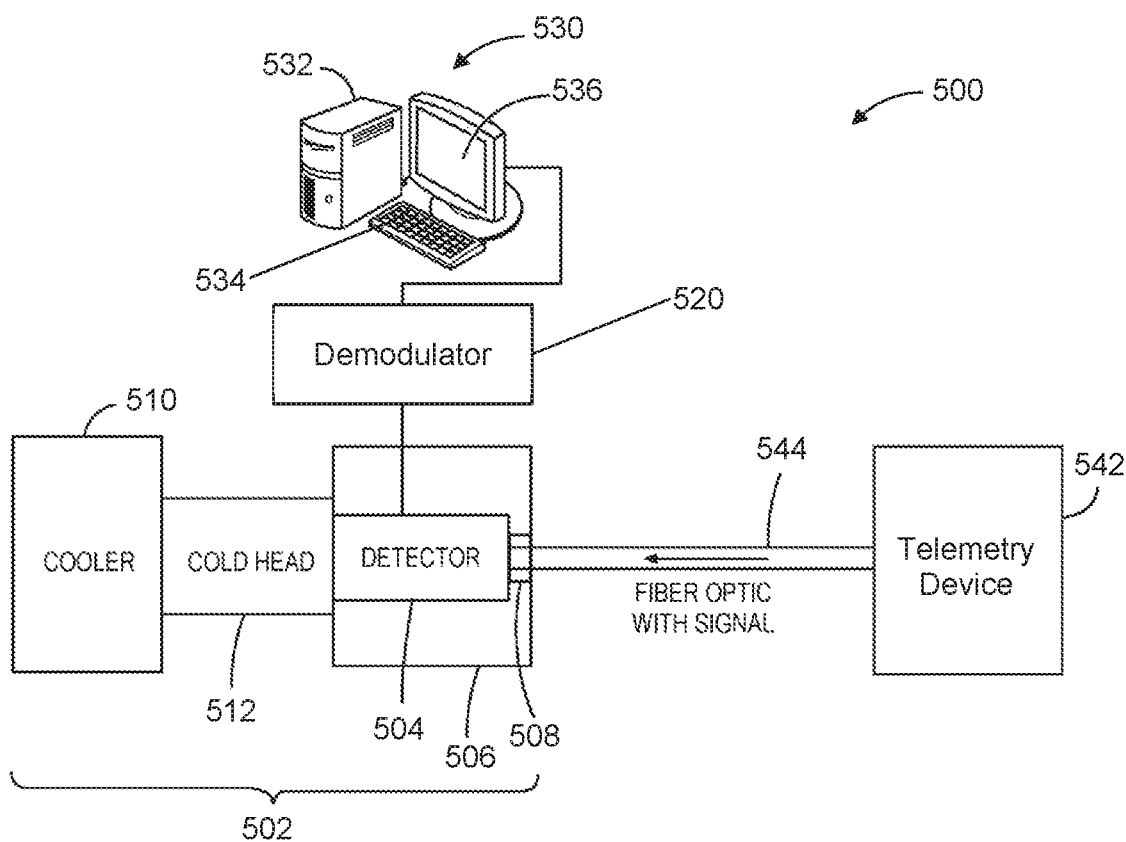
FIG. 5 depicts a diagram view of an example telemetry system, according to one or more embodiments.

As previously mentioned, embodiments of this disclosure employ an optical telemetry system including a single photon detector which allows fiber-optic-based remote telemetry systems to detect low power optical signals (e.g., optical signals with power losses in excess of 100 dB). FIG. 5 shows a diagram view of an optical telemetry system 500 in accordance with one or more embodiments. As shown, the optical telemetry system 500 includes an optical detection apparatus 502, a demodulator 520, a telemetry device 542, a fiber optic cable 544, and a computing system 530.

The optical detection apparatus 502 includes an optical detector 504 for detecting light received through the fiber optic cable 544. In some embodiments, the light includes wavelengths in a visible range of wavelengths. However, embodiments are not limited thereto and the light can include wavelengths in an infrared range of wavelengths and/or in an ultraviolet range of wavelengths.

The optical detector 504 includes a single-photon detector (SPD) or a single-photon avalanche photodiode. An example avalanche photodiode is the PGA-246-25 Single Photon Avalanche Diode available from Princeton Lightwave Inc. of Princeton, New Jersey. The optical detector 504 may also include carbon nanotubes or other nano-structures, photomultiplier tubes (PMTs), light photon counter, transition edge sensor, quantum dots, perovskite/Graphene phototransistors (for room temperature operation), focalized carrier augmented sensors, and cooled p-i-n detectors. However, embodiments are not limited to these example optical detectors and other types of optical detectors can be used. For example, the optical detector 504 can include an integrated optical chip such as a silicon photonic resonator or a focal planar array detector, among other optical detector types.

In embodiments with an optical detector that includes an SPD, the SPD can be used to detect very low light levels found in many photonics based applications. For example, some systems have losses of up to 110 dB, which limits the range, data rate, or the resolution of operation of optical telemetry systems. SPDs may also be used to enhance or increase SNRs by removing noise sources and reducing signal loss.

SPDs, such as superconducting nanowire SPDs (SNSPDs) as further described herein with respect to FIGS. 7A-10, operate by detecting a quantum state disturbance by an incoming photon incident on the corresponding optical detector 504. A photon incident on a nanowire of the optical detector 504 breaks Cooper pairs and creates a localized non-superconducting region, or hotspot, with finite electrical resistance on the nanowire. The demodulator 520 coupled to the optical detector 504 has an impedance lower than an impedance of a non-superconducting region of the optical detector 504 so that current is shunted to the demodulator 520, resulting in a measurable voltage at the demodulator 520. When the current is shunted from the optical detector 504, this allows the non-superconducting region of the optical detector 504 to then be re-cooled below a superconducting critical temperature. The demodulator 520 detects that a signal has been received at the optical detector 504, and the demodulator 520 can provide the signal for further processing as described herein.

By combining the use of SPD-type optical detector 102 at the surface with the downhole telemetry device 542, very low energy optical signals (e.g., at the energy of a single photon) can be detected. In addition, SNSPD-type optical detectors 504 can provide efficient operation at a wide range of wavelengths (e.g., from ultra violet to mid infrared wavelength regions), low dark counts (due to the removal of thermal noise from the optical telemetry system 500), short recovery periods (e.g., recovery periods on the order of 1-10 nanoseconds), and low timing jitter (e.g., timing jitter on the order of 100-500 picoseconds). SPD-type optical detectors 504 can be integrated into closed-cycle refrigerator-based detector systems, allowing for advanced photon counting in oil and gas exploration operations that rely on portability and durability in fielded detection devices and systems.

SPDs can operate over wavelengths of 100-200 nm centered around a center frequency that depends on the fabrication of the SPD. By changing parameters of the fabrication (e.g., the timing or duration of etching or the thickness of a nanowire layer, substrate, or other thickness), the center frequency can be constructed to span wavelengths between ultraviolet wavelengths to mid/far infrared (~200 nm to ~10 micron). Once fabricated though, the SNSPD device spans up to ~200 nm. Accordingly, to detect wavelengths covering a range of 200 nm to 10,000 nm, an optical detection apparatus includes 50 SPDs with center frequencies separated by 200 nm to provide the maximum wavelength of 10,000 nm.

Additionally, by adjusting or adapting the width, pitch, and angle of the nanowire/s during fabrication of the optical detector 504, the optical detector 504 can be made more efficient. In a 100% efficient SPD-type optical detector 504, a signal is produced every time a single photon enters the optical detector 504. However, photons can arrive at the optical detector 504 at different polarizations (among other variations). SNSPDs are sensitive to the polarization of light due to the usage of nanowires in their construction, because nanowires are relatively straight along their length, and thus nanowires detect fields that align with the nanowire along its length. The geometry of the optical detector 504 can be designed to either match a specific polarization state (either orientation of linear polarization or circular polarization) of the incoming light, or designed to detect any polarization state (such as by having the wires go in one linear direction for one part of the detector and in an orthogonal linear direction for another part of the detector).

The optical detection apparatus 502 includes a housing 506 for enclosing and providing an optical shield for the optical detector 504. The housing 506 includes an aperture 508 for passage of the fiber optic cable 544. However, embodiments are not limited thereto, and in some embodiments, a coupler can be mounted so that the fiber optic cable 544 terminates at a boundary of the housing 506. The housing 506 may also include a non-reflective inner surface to mitigate the reflection of light by the housing 506.

The optical detection apparatus 502 further includes a cooling mechanism 510 thermally connected with the housing 506. The cooling mechanism 510 is configured to maintain the temperature of a light sensitive region of the optical detector 504 within a temperature range of 5 to 210 degrees Kelvin, and in one or more embodiments, at or below 80 degrees Kelvin or even five degrees Kelvin (e.g., when sealed helium systems are used). In some embodiments, the cooling mechanism 510 operates using liquid helium (He) or liquid nitrogen ($N_2$). In some embodiments, the cooling mechanism 510 can be of one or more of a variety of configurations, including Dilution-Magnetic, Collins-Helium-Liquefier, Joule-Thomson, Stirling-cycle cryocooler, self-regulated Joule-Thomson, Closed-Cycle Split-Type Stirling, Pulse Tube, a two stage Gifford-McMahon cryogenic cooler or multi stage Gifford McMahon cryogenic cooler, or a cooler using magnetocaloric effect, by way of example. Lowering the temperature of the optical detector 504 improves the SNR of the optical detector 504 by decreasing dark current, by increasing sensitivity, and by reducing resistive loss by causing the optical detector 504 to enter a superconducting regime of operation.

In one or more embodiments, the optical detection apparatus 502 includes a cold head 512 between the optical detector 504 and the cooling mechanism 510. However, some embodiments do not include a cold head 512. In one or more embodiments, the housing 506 is mounted to the cooling mechanism 510 such that moisture is prevented from entering the housing. For example, the housing 506 can be mounted such that a vacuum seal is formed with the cooling mechanism 510 or the cold head 512.

The fiber optic cable 544 is positioned in the wellbore to provide a communication path for the telemetry device 542. The fiber optic cable 544 may be single mode or multimode fiber optic cable. The fiber optic cable 544 may be selected to obtain an optical signal having wavelengths ranging from 400 nm to four microns.

The optical telemetry system 500 includes a telemetry device 542 that is in communication with the optical detector 504 via the fiber optic cable 544. The telemetry device 542 is positionable in a wellbore as depicted in FIGS. 1-3 and transmits information to a computing system 530 through the optical detection apparatus 502. The information transmitted to the surface may include measurements of the formation, the wellbore, or the downhole tools. To communicate the information, the telemetry device 542 modulates the information into an optical signal and transmits the optical signal on the fiber optic cable 544 to the surface. For modulation, the telemetry device 542 may employ digital or analog modulation schemes. For example, the telemetry device 542 may employ phase shift keying, frequency shift keying, amplitude-shift keying, quadrature amplitude modulation, on-off keying, orthogonal frequency-division multiplexing, pulse-code modulation, any suitable modulation technique, or combination thereof. The telemetry device 542 may encode the information by modulating the amplitude, phase, wavelength, or polarization of the optical signal.

The optical telemetry system 500 also includes a light source (not shown) which is described in further detail with respect to FIGS. 12A-C. The telemetry device 542 may include the light source for emitting light into the fiber optic cable 544. In some embodiments, the light source may be positioned at the surface and transmit light downhole to the telemetry device 542 to be modulated. The light source may also provide light from the surface to the telemetry device through a fiber optic cable 544 and light can be transmitted to the optical detector 504 on a separate fiber optic cable 544, although embodiments are not limited to any particular number of fiber optic cables 544 or combinations thereof. The light source can also include additional optical components configured to provide or deliver the appropriate light to the system including filters, mixers, non-linear crystals, timing chips, wavelength multiplexers, etc. The optical telemetry system 500 may also include multiple light sources on the surface, downhole, or a combination thereof.

The optical telemetry system 500 also includes a demodulator 520 operably connected to the optical detection apparatus and the computing device 530 for demodulating the optical signal transmitted from the telemetry device 542. The modulated optical signal propagates along fiber optic cable 544 and is received by the optical detector 504. The optical detector 504 may convert the optical signal into a digital signal for further processing such as demodulation and decoding by the demodulator 520. The demodulator 520 may be one or more processes or computing systems that include one or more processors (not shown) and memory (not shown), see, e.g., FIG. 12.

The optical telemetry system 500 can further include a computing system 530 coupled to the demodulator 520 at the Earth's surface and may be implemented as the surface controller of FIGS. 1-3. The computing system 530 processes the downhole information, such as receiving the downhole measurements and taking actions in response to the measurements. For example, the computing system 530 may adjust the wellbore trajectory by controlling the direction a bit bores into the formation.

The computing system 530 includes a computing device 532, an input device 534, and output device 536. The computing system 530 may be, for example, a mobile device, tablet computer, laptop computer, desktop computer, or server, see, e.g., the computing system of FIG. 12. The computing device 532 may include one or more processors, memory (e.g., random access memory), and persistent storage (e.g., disk drives, solid state drives, etc.). The persistent storage may store computer instructions, e.g., computer code, that when executed by the processor(s) of the computing device 532 cause the computing device to perform the functions and methods described herein.

In some embodiments, some portions of the optical telemetry system 500 can be positioned at a surface of the Earth, while some portions to the optical telemetry system 500 can be placed downhole. When more than one optical detector 504 is used, for example, some of the optical detectors 504 can be placed downhole, and some can be placed at the surface. In some embodiments, one or more cooling mechanisms 510 can be placed downhole proximate one or more optical detectors 502 although power and geometry considerations should be taken into account with such configurations to provide power for cooling in an appropriately sized borehole.

The optical telemetry system 500 can include more than one optical detector 504. At least one optical detector 504 can detect light received through the fiber optic cable 544 from at least one telemetry device 542. The optical telemetry system 500 can also include optical detectors 504 of more than one type. For example, some optical detectors 504 in the optical telemetry system 500 can be SPDs, SNSPDs, SNSPDs with different wavelengths selected, avalanche photodiodes, integrated optical chips, etc.

An SNSPD of the optical detector for use in various embodiments can also be configured to include a superconductive meandering nanowire structure. FIG. 6A shows a schematic view of an SNSPD 600 using meandering nanowires 602. FIG. 6B shows an enlarged view of the SNSPD 600 of FIG. 6A. The SNSPD 600 of FIGS. 6A and 6B can include niobium nitride nanowires grown on magnesium oxide or sapphire substrates, although embodiments are not limited to any particular substrate material or nanowire material. For example, the nanowires 602 can also include tungsten silicide, niobium silicide, and tantalum nitride. The nanowires 602 meander between bonding pads 604 in a compact meander geometry to create a square or circular pixel with high detection efficiency. Embodiments are not limited to a meandering nanowire 602. For example, the nanowires 602 can be configured in a superconductive interleaved nanowire structure, and/or nanowires 602 can be parallel to each other.

The dimensions (e.g., diameter, length, etc.) of the nanowires 602 are chosen such that a uniform optical cavity, optimized for the specific wavelength of the produced light, is provided along the length of nanowire. The nanowires 602 can be fabricated such that the diameter of the nanowire 602 is sufficiently wide to capture the desired light. For example, the diameter of the nanowire 602 should be larger than $\lambda/2n_w$, wherein $\lambda$ is the wavelength of the desired light, and $n_w$ is the refractive index of the nanowire. For example, nanowires 602 used in various embodiments can have diameters of about 90-100 nanometers or less, or to a few hundred nanometers.

Some embodiments provide a reflective layer or a cavity on the substrate that extends under the nanowire 602. The reflective layer can reflect light that is guided by the nanowire 602. The reflective layer can be provided in the form of a multilayered structure comprising repeated layers of silicates for example, or as a metal film to provide further system efficiencies due to light or photon reflection that allows the nanowire a second chance to detect a given photon or photons. Some embodiments can include many layers (e.g., three to five layers, or more) of photonic crystals (e.g., $Ta_2O_5$ or $SiO_2$).

In one or more embodiments, the optical detector includes an SNSPD-type optical detector 602 with multiple superconducting nanowire structures. FIG. 7 shows a schematic view of an SNSPD having multiple superconducting nanowire structures 702, 704, 706, 708, 710, 712, 714, 716, 718 arranged in parallel in accordance with various embodiments. The multiple superconducting nanowire structures 702, 704, 706, 708, 710, 712, 714, 716, 718 may share a common ground 720 or groups of multiple superconducting nanowire structures may share a common ground. The common ground may also be on a second surface of the magnesium oxide substrate (or other type of substrate) opposing the first surface of the magnesium oxide substrate on which the superconducting nanowire structures 702, 704, 706, 708, 710, 712, 714, 716, 718 are grown. The multiple superconducting nanowire structures 702, 704, 706, 708, 710, 712, 714, 716, 718 are each configured to measure a particular optical signal as described in more detail below (e.g., a particular wavelength or polarization). At least two of the multiple superconducting nanowire structures have separate power sources.

Figure 8:
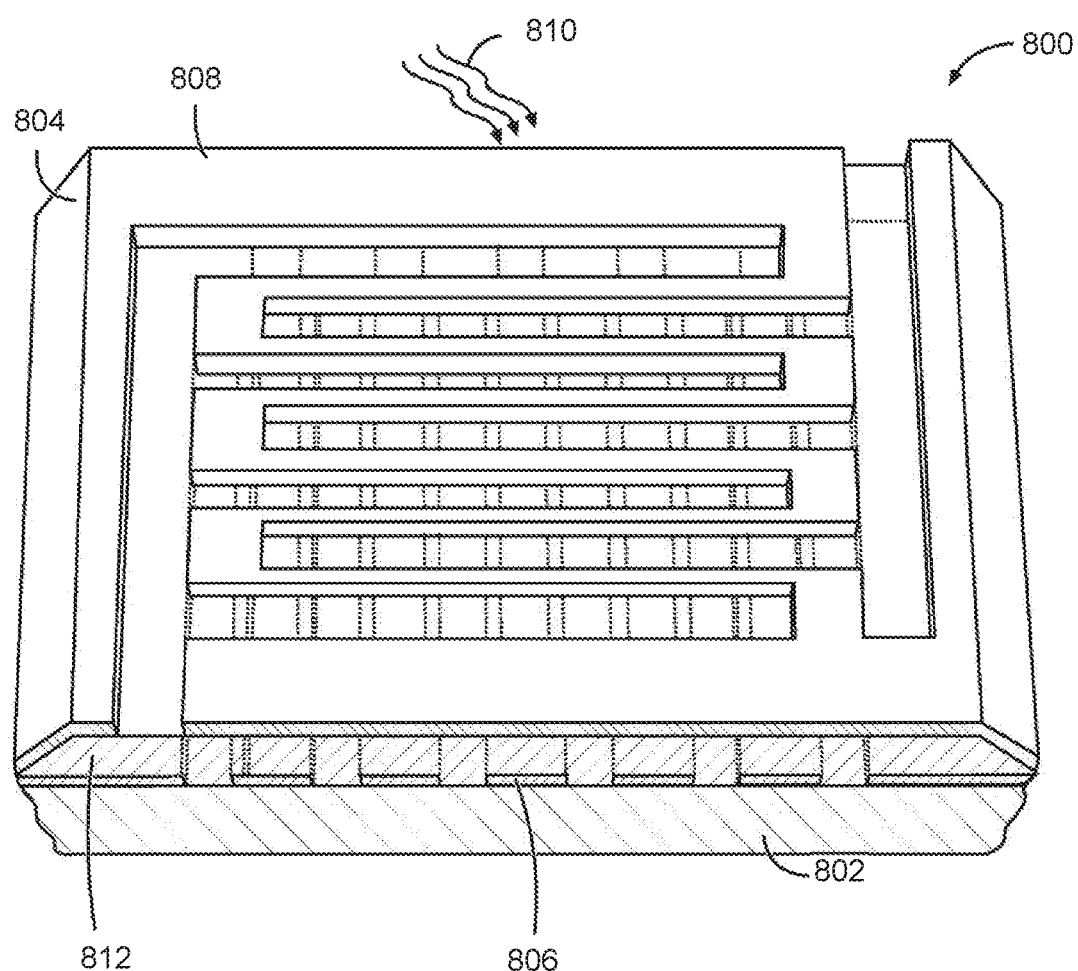
FIG. 8 depicts a schematic view of an example multilayered SNSPD, according to one or more embodiments.

Multilayer SNSPD constructions provide an optical detector sensitive to multiple polarizations or wavelengths. For example, as shown in FIG. 8, two or more layers 802 and 804 can be vertically stacked and connected in parallel (with a common power source, common ground, etc.) to form a multilayer SNSPD 800. Each layer 802, 804 has nanowires 806, 808 meandering in different patterns, or oriented at orthogonal angles with respect to one another, so that reduced absorptance of light 810 incident on the SNSPD 800 at one layer 802, 804 will be offset or adjusted for by absorptance variations at the other layer 802, 804. By using multiple layers of nanowires 806, 808 with different pitches and patterns, polarization sensitivity can be reduced and the efficiency of the optical detector 504 (FIG. 5) can be enhanced or improved. Additionally, or in the alternative, each layer may detect a different wavelength or range of wavelengths, so that the optical detector 504 can detect a range of wavelengths.

Figure 9:
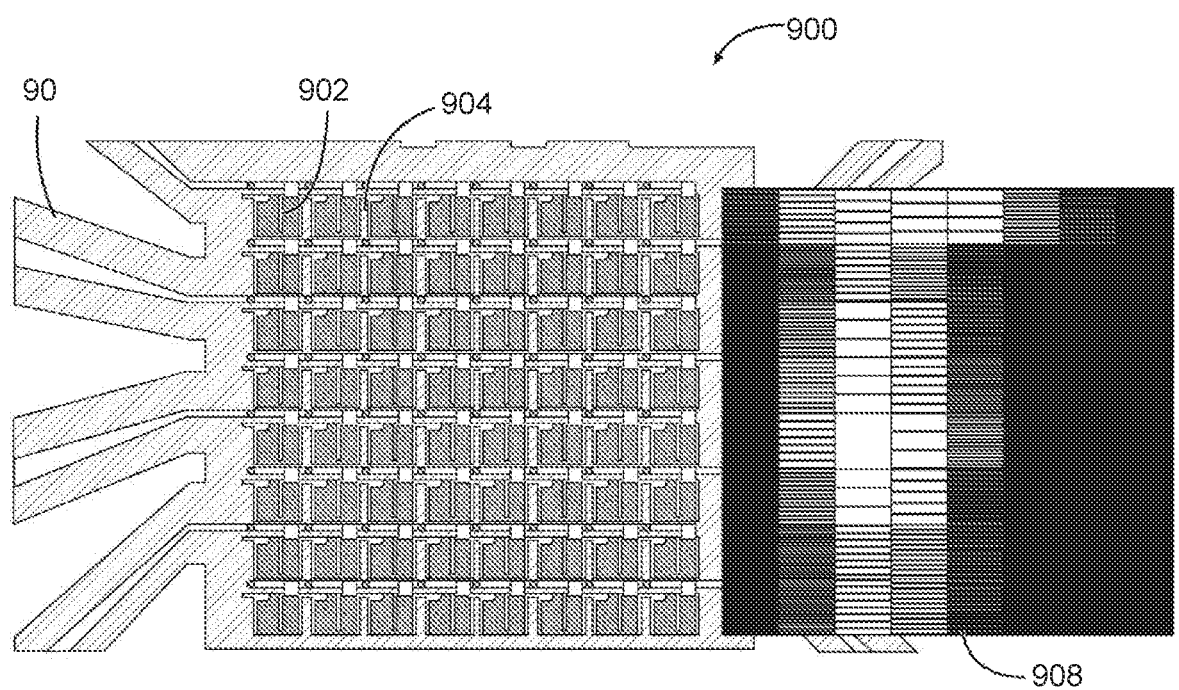
FIG. 9 depicts a schematic view of an example array of single-photon detectors (SPDs), according to one or more embodiments.

The optical detector may also utilize an array of SPDs to detect optical signals. FIG. 9 shows a schematic view of an example SPD array 900 for optical signal detection in accordance with one or more embodiments. Arrays of SNSPDs (e.g., "pixels") 902 can be used to detect optical telemetry signals under low light (e.g., "photon starved") conditions, e.g. optical signals of −130 dBm to −160 dBm. As used herein, a pixel refers to an individual single-photon detector (e.g., SNSPD 600). The array 900 shown in FIG. 9 includes 64 pixels 902. In comparing FIG. 9 with FIG. 7, it will be appreciated that each of nanowire structures 702, 704, 706, 708, 710, 712, 714, 716, 718 also correspond to pixels 902. The pixels 902 can be fabricated on a silicon substrate with a thermally oxidized silicon oxide layer or on single crystal MgO, although embodiments are not limited thereto. Interconnection lines 904 can be formed in the spaces between pixels 902, and these interconnection lines can be connected to coplanar waveguide lines 906. By creating a regular pattern over a large number of pixels (e.g., 64-100 pixels, though as few as two pixels can be used, or more than 100 pixels may be used), operators can gain information about the spatial distribution 908 of the incoming stream of photons. This facilitates an optical detector that is sensitive to a range of wavelengths and multiple polarizations.

Figure 10:
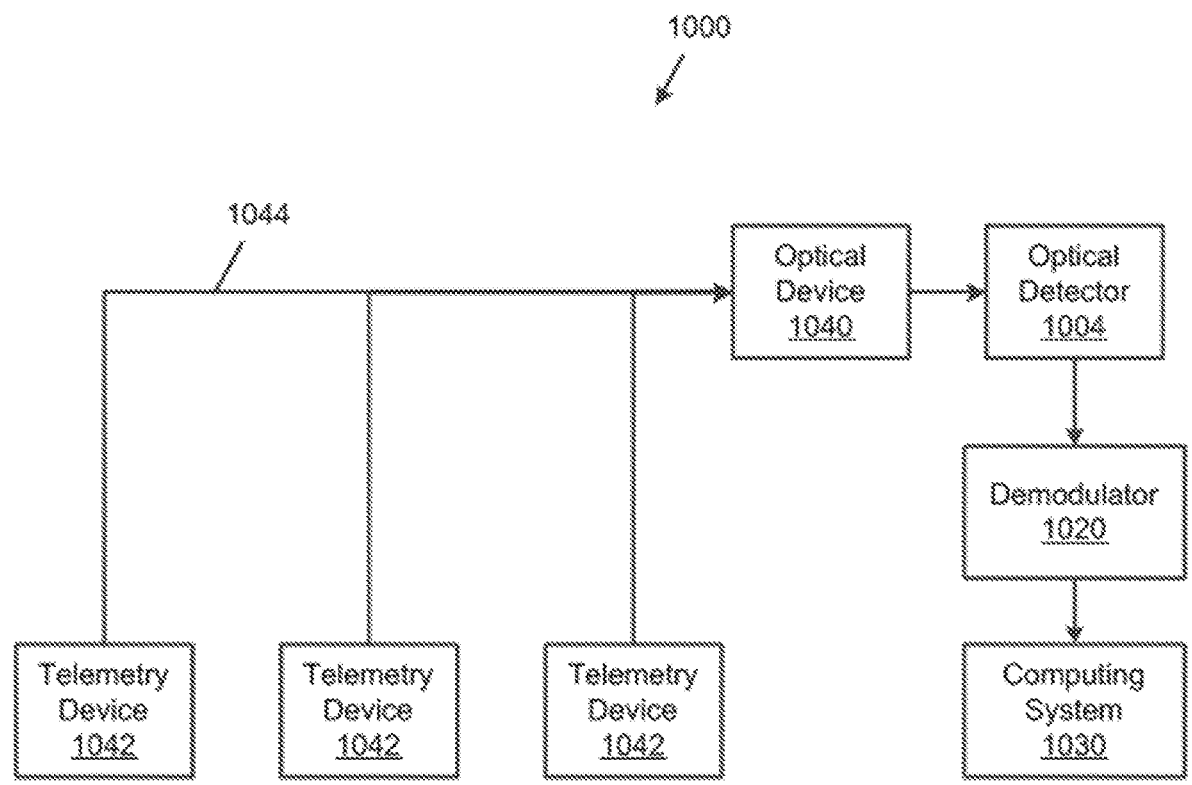
FIG. 10 depicts a diagram view of an example telemetry system, according to one or more embodiments.

Each pixel in the SPD array 900 can detect single photons and can be designed to detect different wavelengths or polarizations. One of the single-photon detectors 902 may be tuned to receive an optical signal at a first wavelength, and another one of the single-photo detectors 902 may be tuned to receive the optical signal at a second wavelength different from the first wavelength. The array SPD 900 can thus simultaneously monitor multiple telemetry data streams, from separate tools, installations, or as shown in FIG. 10, multiple telemetry devices. The SPD array 900 may also facilitate detecting optical signals from various optical systems alongside optical telemetry including but not limited to distributed acoustic sensing, distributed temperature sensing, spectroscopy, other remote optical sensors, any other optical system, or combination thereof. For instance, some pixels 902 of the array may be dedicated to detecting optical telemetry signals, whereas other pixels 902 are dedicated to detecting the optical signals from other optical systems as mentioned above.

FIG. 10 shows a block diagram view of an optical telemetry system 1000 that detects the optical signals from multiple telemetry data streams, in accordance with one or more embodiments. As shown, the telemetry devices 1042 are operably connected to the optical detector 1004 via the fiber optical cables 1044. The telemetry devices 1042 may be deployed at different locations or depths of a wellbore. In some embodiments, each of the telemetry devices 1042 may be positioned in a different lateral wellbore of a multilateral wellsite. The optical detector 1004 may include an array of SPDs as depicted in FIGS. 7 and 9. The optical detector 1004 may detect multiple wavelengths on a single fiber (to increase telemetry capacity for example), or multiple fibers, each carrying a different wavelength, can go into the optical detector 1004.

Each of the telemetry devices 1042 may encode and transmit data using a different wavelength. Also, each fiber optic cable 1044 from the telemetry devices 1042 can be connected to a pixel of the SPD array designed for the specific wavelength via the optical device 1040. Further, the optical device 1140 may spatially direct the optical signals from the telemetry devices 1042 to the corresponding pixel of the SPD array. More specifically, the optical signal transmitted from one of the telemetry devices 1042 may employ a particular wavelength different from the other telemetry devices 1042. The optical device 1040 may direct that particular wavelength to the corresponding pixel that is configured to detect such a wavelength.

Figure 11A:
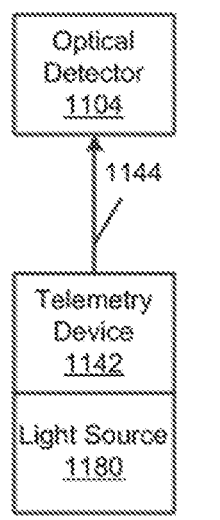
FIG. 11A-C depicts diagram views of various configurations for the light source and fiber optic cable in telemetry systems, according to one or more embodiments.

As previously mentioned, the optical telemetry system may utilize a light source in the wellbore (FIG. 11A) or at the surface (FIGS. 111B, C). If so, the optical telemetry system may also employ a fiber optic cable for downlink communications and a separate fiber optic cable for uplink communications (FIG. 11C). For example, FIG. 11A shows a block diagram view of an optical telemetry system 1100A that employs a light source 1180 in the wellbore, in accordance with one or more embodiments. The light source 1180 may include diode lasers, light emitting diodes, superluminescent diodes, quantum dot lasers, vertical cavity surface emitting lasers, fiber lasers, cavity lasers, titanium-sapphire lasers, pump lasers, two-dimensional light emitting heterostructures, incandescent light bulbs, gas glow lamps, fluorescent lamps, any suitable light source, or combination thereof. The telemetry device 1142 may modulate the light received from the light source 1180 and transmit an optical signal through the fiber optic cable 1144.

Figure 11B:
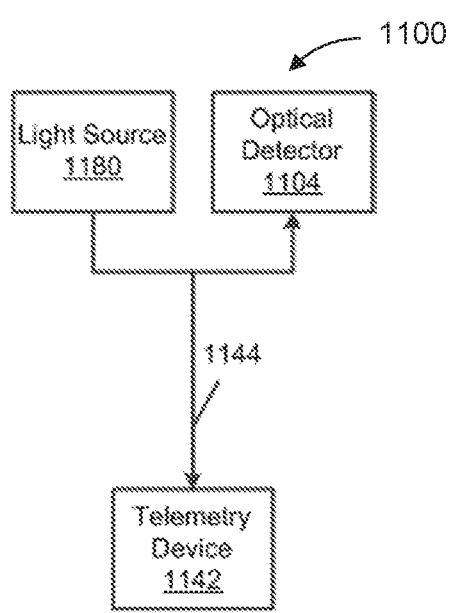
Figure 11C:
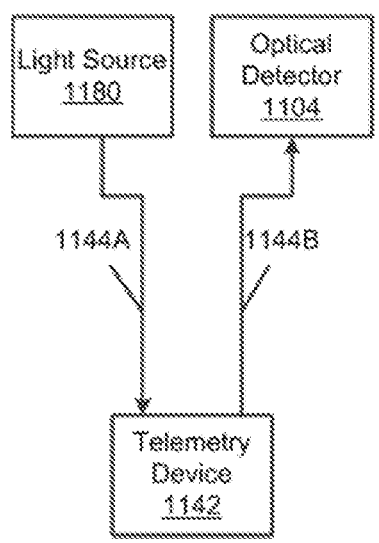

FIG. 11B shows a block diagram view of an optical telemetry system 1200B that employs a light source at the surface in accordance with one or more embodiments. As shown, the light source 1180 transmits light into the fiber optical cable 1144, and the light is received by the telemetry device 1142 in the wellbore. The telemetry device 1142 modulates the light to transmit an optical signal through the same fiber optic cable 1144. The optical signal may be modulated at a different wavelength than the wavelength of the light transmitted from the surface by the light source 1180 to mitigate interference. The optical detector 1104 receives the modulated optical signal 1104 and converts the optical signal into a digital signal for further processing as described herein with respect to FIG. 5.

FIG. 11C shows a block diagram view of an optical telemetry system 1100C that employs a light source 1180 at the surface as well as separate fiber optic cables 1144A, B for downlink and uplink communications. As shown, the fiber optic cable 1144A provides a downlink communication path to the telemetry device 1142, whereas the fiber optic cable 1144B provides an uplink communication for the modulated optical signal. The telemetry device 1142 modulates the light received from the light source 1180 via the fiber optic cable 1144A and transmits the modulated optical signal through the fiber optic cable 1144B.

Figure 12:
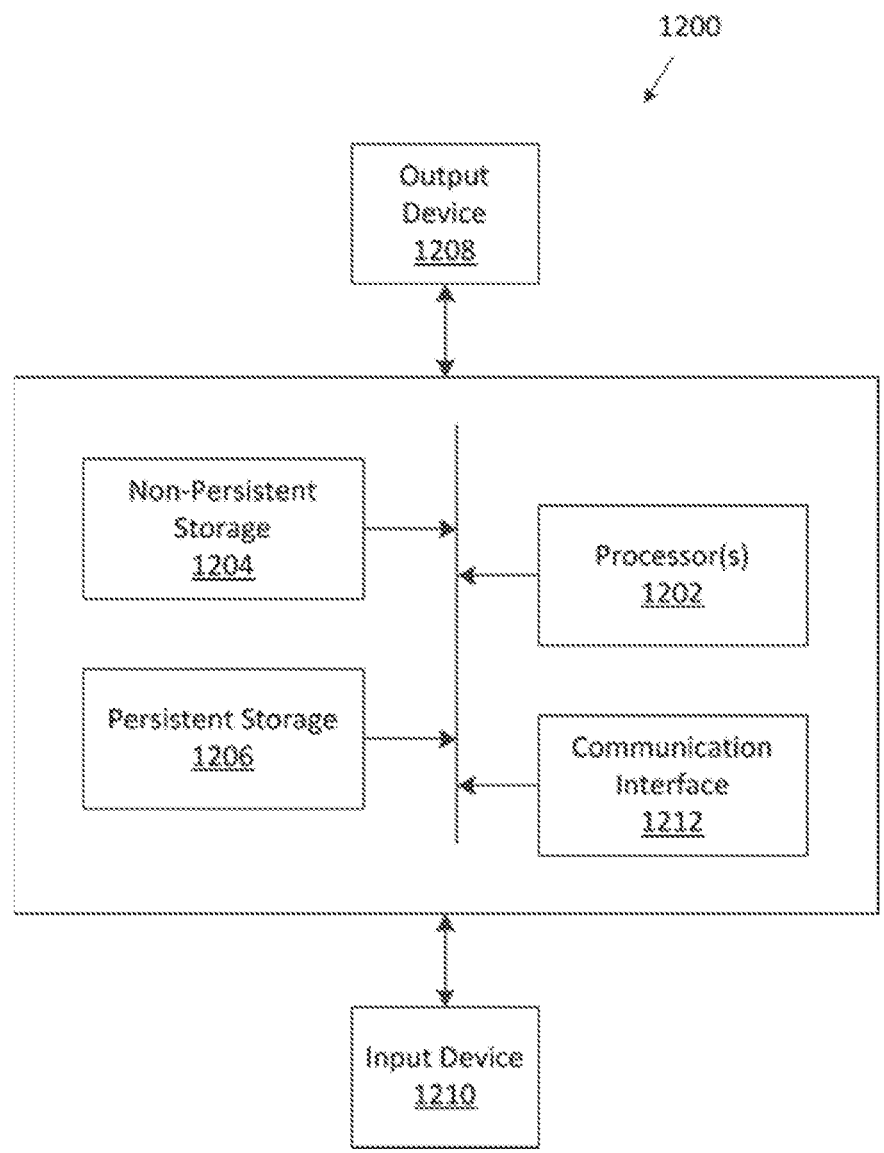
FIG. 12 depicts a diagram view of a computing system, according to one or more embodiments.

FIG. 12 shows a diagram view of a computing system in accordance with one or more embodiments. The computing system 1200 may include one or more computer processors 1202, non-persistent data storage 1204 (e.g., volatile memory, such as random access memory (RAM), cache memory), persistent data storage 1206 (e.g., a hard disk, an optical drive such as a compact disk (CD) drive or digital versatile disk (DVD) drive, a flash memory, etc.), a communication interface 1212 (e.g., Bluetooth interface, infrared interface, network interface, optical interface, etc.), input devices 1210, output devices 1208, and numerous other elements (not shown) and functionalities. Each of these components is described below.

The computer processor(s) 1202 may be an integrated circuit for processing instructions. For example, the computer processor(s) may be one or more cores or micro-cores of a processor. The computing system 1200 may also include one or more input devices 1210, such as a touchscreen, keyboard, mouse, microphone, touchpad, electronic pen, or any other type of input device. Further, the communication interface 1212 may include an integrated circuit for connecting the computing system 1200 to a network (not shown) (e.g., a local area network (LAN), a wide area network (WAN) such as the Internet, mobile network, or any other type of network) and/or to another device, such as another computing system.

The computing system 1200 may also include one or more output devices 1208, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 1202, non-persistent storage 1204, and persistent storage 1206. Many different types of computing systems exist, and the aforementioned input and output device(s) may take other forms.

Embodiments of this disclosure enable optical telemetry systems to yield various improvements such as extending the range, data rate, and reliability of optical telemetry. This is because SPD optical detectors are capable of detecting low power light. For instance, SPD optical detectors may enable the use of fiber optics in drilling applications where optical power losses may be exceed 100 dB due to the optical connector requirements along the drill string.

SPD optical detectors can also extend the service life of existing fiber optic systems that may be experiencing attenuation from hydrogen darkening or the like. As permanent monitoring systems (e.g., FIG. 3) age, the fiber optic cables may absorb hydrogen, which darkens the fiber, resulting in attenuation increase over the service life of the fiber. With non-SPD optical detectors, the service life of the optical system may be limited to a year before hydrogen darkening renders the optical system obsolete. SPD optical detectors can be operably connected to aged-fiber optic systems that produce optical losses outside the range of non-SPD optical detectors to detect, yielding an extended service life of the aged-fiber optic system, which can extend the service life to match the service life of the well on the order of, for example, fifty years.

SPD optical detectors can also improve the telemetry range of fiber optic systems. For instance, SPD optical detectors may facilitate the use of longer fiber optic cables, especially for offshore applications, on the order of, for example, 50,000 feet (15,240 meters). Longer fiber optic cables in turn eliminate the need for ancillary optical equipment, such as optical repeaters or connectors, on deep-water rigs.

SPD optical detectors can be employed with low power light sources, which in turn reduce the power requirements of the light source. Low power light sources may in turn reduce the risk of accidental ignition and destruction of the well and reduce the non-linearity observed in fiber propagation and reducing the associated noise.

In addition to the embodiments described above, many examples of specific combinations are within the scope of the disclosure, some of which are detailed below:

Example 1: A telemetry system for use in a wellbore extending from the surface, comprising: a fiber optic cable locatable in the wellbore, the fiber optic cable including at least one optical fiber; a telemetry device operable to transmit an optical telemetry signal over the fiber optic cable; and an optical detector operably connected to the fiber optic cable and comprising a single-photon detector operable to receive the optical telemetry signal transmitted over the fiber optic cable.

Example 2: The telemetry system of example 1, wherein the optical detector is operable to detect a plurality of optical telemetry signals transmitted from telemetry devices located in the wellbore.

Example 3: The telemetry system of example 1, wherein the telemetry device comprises a light source operable to transmit the optical telemetry signal.

Example 4: The telemetry system of example 1, wherein the single-photon detector comprises a superconducting nanowire single-photo detector.

Example 5: The telemetry system of example 1, further comprising a cryogenic cooler in thermal communication with the optical detector and operable to maintain a temperature of light-sensitive regions of the single-photon detector within a superconducting temperature range of the single-photon detector.

Example 6: The telemetry system of example 1, wherein the optical detector comprises a plurality of single-photon detectors arranged in an array.

Example 7: The telemetry system of example 6, wherein one of the single-photon detectors is tuned to receive the optical signal at a first wavelength, and another one of the single-photo detectors is tuned to receive the optical signal at a second wavelength different from the first wavelength.

Example 8: The telemetry system of example 6, wherein the at least one optical fiber comprises at least two optical fibers, wherein one of the single-photon detectors is in optical communication with one of the optical fibers, and another one of the single-photon detectors is in optical communication with another one of the optical fibers.

Example 9: The telemetry system of example 1, further comprising an optical amplifier connected along the fiber optic cable.

Example 10: The telemetry system of example 1, wherein the optical detector is located at a surface location.

Example 11: A method of communicating in a wellbore, comprising: positioning a telemetry device at a downhole location in the wellbore; transmitting an optical telemetry signal over a fiber optic cable using the telemetry device, the fiber optic cable including at least one optical fiber; and receiving the optical telemetry signal by an optical detector operably connected to the fiber optic cable and comprising a single-photon detector.

Example 12: The method of example 11, further comprising demodulating the received optical telemetry signal to obtain information from the telemetry device.

Example 13: The method of example 11, wherein transmitting the optical telemetry signal using the telemetry device comprises transmitting light from a light source.

Example 14: The method of example 11, wherein the single-photon detector comprises a superconducting nanowire single-photo detector.

Example 15: The method of example 11, further comprising maintaining a temperature of light-sensitive regions of the single-photon detector within a superconducting temperature range of the single-photon detector using a cooler.

Example 16: The method of example 11, wherein the optical detector comprises a plurality of single-photon detectors arranged in an array.

Example 17: The method of example 16, wherein the receiving comprises receiving the optical signal at a first wavelength by one of the single-photon detectors and receiving the optical signal at a second wavelength by another one of the single-photon detectors.

Example 18: The method of example 11, further comprising: transmitting a second optical telemetry signal over a second fiber optic cable positioned in the wellbore using a second telemetry device; and receiving the second optical telemetry signal by one of the single-photon detectors.

Example 19: The method of example 11, further comprising amplifying the optical telemetry signal along the optical fiber using an optical amplifier.

Example 20: The method of example 11, wherein the optical detector is located at a surface location.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the disclosure, except to the extent that they are included in the accompanying claims.

What is claimed is:

1. A telemetry system for use in a wellbore extending from the surface, comprising:
   a fiber optic cable locatable in the wellbore, the fiber optic cable including at least an optical fiber;
   a telemetry device operable to transmit an optical telemetry signal over the fiber optic cable; and
   an optical detector operably connected to the fiber optic cable and comprising a single-photon detector operable in ultraviolet, visible, and infrared wavelengths to receive the optical telemetry signal transmitted over the fiber optic cable and to increase a signal to noise ratio of the signal.

2. The telemetry system of claim 1, wherein the optical detector is operable to detect a plurality of optical telemetry signals transmitted from telemetry devices located in the wellbore.

3. The telemetry system of claim 1, wherein the telemetry device comprises a light source operable to transmit the optical telemetry signal.

4. The telemetry system of claim 1, wherein the single-photon detector comprises a superconducting nanowire single-photo detector.

5. The telemetry system of claim 1, further comprising a cryogenic cooler in thermal communication with the optical detector and operable to maintain a temperature of light-sensitive regions of the single-photon detector within a superconducting temperature range of the single-photon detector.

6. The telemetry system of claim 1, wherein the optical detector comprises a plurality of single-photon detectors arranged in an array.

7. The telemetry system of claim 6, wherein one of the single-photon detectors is tuned to receive the optical signal at a first wavelength, and another one of the single-photo detectors is tuned to receive the optical signal at a second wavelength different from the first wavelength.

8. The telemetry system of claim 6, wherein the at least an optical fiber comprises at least two optical fibers, wherein one of the single-photon detectors is in optical communication with one of the optical fibers, and another one of the single-photon detectors is in optical communication with another one of the optical fibers.

9. The telemetry system of claim 1, further comprising an optical amplifier connected along the fiber optic cable.

10. The telemetry system of claim 1, wherein the optical detector is located at a surface location.

11. A method of communicating in a wellbore, comprising:
    positioning a telemetry device at a downhole location in the wellbore;
    transmitting an optical telemetry signal over a fiber optic cable using the telemetry device, the fiber optic cable including at least one optical fiber; and
    receiving the optical telemetry signal by an optical detector operably connected to the fiber optic cable and comprising a single-photon detector operable in ultraviolet, visible, and infrared wavelengths and to increase a signal to noise ratio of the signal.

12. The method of claim 11, further comprising demodulating the received optical telemetry signal to obtain information from the telemetry device.

13. The method of claim 11, wherein transmitting the optical telemetry signal using the telemetry device comprises transmitting light from a light source.

14. The method of claim 11, wherein the single-photon detector comprises a superconducting nanowire single-photo detector.

15. The method of claim 11, further comprising maintaining a temperature of light-sensitive regions of the single-photon detector within a superconducting temperature range of the single-photon detector using a cooler.

16. The method of claim 11, wherein the optical detector comprises a plurality of single-photon detectors arranged in an array.

17. The method of claim 16, wherein the receiving comprises receiving the optical signal at a first wavelength by one of the single-photon detectors and receiving the optical signal at a second wavelength by another one of the single-photon detectors.

18. The method of claim 11, further comprising:
    transmitting a second optical telemetry signal over a second fiber optic cable positioned in the wellbore using a second telemetry device; and
    receiving the second optical telemetry signal by one of the single-photon detectors.

19. The method of claim 11, further comprising amplifying the optical telemetry signal along the optical fiber using an optical amplifier.

20. The method of claim 11, wherein the optical detector is located at a surface location.

* * * * *